United States Patent
Hird et al.

(10) Patent No.: US 8,572,394 B2
(45) Date of Patent: Oct. 29, 2013

(54) OTP GENERATION USING A CAMOUFLAGED KEY

(75) Inventors: Geoffrey R. Hird, Cupertino, CA (US); Rammohan Varadarajan, Cupertino, CA (US)

(73) Assignee: Computer Associates Think, Inc., Islandia, NY (US)

( * ) Notice: Subject to any disclaimer, the term of this patent is extended or adjusted under 35 U.S.C. 154(b) by 284 days.

(21) Appl. No.: 12/871,559

(22) Filed: Aug. 30, 2010

(65) Prior Publication Data

US 2011/0060913 A1    Mar. 10, 2011

Related U.S. Application Data

(60) Provisional application No. 61/240,010, filed on Sep. 4, 2009.

(51) Int. Cl.
*G06F 21/00* (2013.01)

(52) U.S. Cl.
USPC ........... 713/184; 713/159; 713/182; 713/185; 726/2; 726/3; 726/4; 726/5; 726/9

(58) Field of Classification Search
None
See application file for complete search history.

(56) References Cited

U.S. PATENT DOCUMENTS

| | | | |
|---|---|---|---|
| 6,956,950 B2 | 10/2005 | Kausik | |
| 7,454,782 B2 | 11/2008 | Rajasekaran et al. | |
| 2002/0141575 A1* | 10/2002 | Hird | 380/44 |
| 2004/0128201 A1* | 7/2004 | Ofir et al. | 705/17 |
| 2004/0131182 A1* | 7/2004 | Rogaway | 380/37 |
| 2006/0080545 A1* | 4/2006 | Bagley | 713/183 |
| 2006/0136739 A1* | 6/2006 | Brock et al. | 713/184 |
| 2007/0130463 A1 | 6/2007 | Law et al. | |
| 2007/0133591 A1* | 6/2007 | Shatford | 370/457 |
| 2008/0301461 A1 | 12/2008 | Coulier et al. | |
| 2009/0048971 A1* | 2/2009 | Hathaway et al. | 705/41 |
| 2009/0185687 A1 | 7/2009 | Wankmueller et al. | |
| 2009/0320118 A1* | 12/2009 | Muller et al. | 726/9 |
| 2010/0304819 A1* | 12/2010 | Stockdale et al. | 463/16 |

FOREIGN PATENT DOCUMENTS

WO    2009001020 A1    12/2008

OTHER PUBLICATIONS

Aviel D. Rubin, Independent One-Time Passowrds, Jun. 1995, USENIX UNIX Security Symposium, all pages.*

* cited by examiner

*Primary Examiner* — Kaveh Abrishamkar
*Assistant Examiner* — Adrian Stoica
(74) *Attorney, Agent, or Firm* — Quinn Law Group, PLLC

(57) ABSTRACT

A system and method is provided for generating a one-time passcode (OTP) from a user device. The method includes providing a passcode application and a cardstring defined by a provider account to the user device. The passcode application is configured to generate a passcode configured as a user OTP for the provider account, using the cardstring. The cardstring is defined by at least one key camouflaged with a personal identification number (PIN). The key may be camouflaged by modifying and encrypting the modified key under the PIN. The key may be configured as a symmetric key, a secret, a seed, and a controlled datum. The cardstring may be an EMV cardstring; and the key may be a UDKA or UDKB. The cardstring may be an OTP cardstring, and the key may be a secret configurable to generate one of a HOTP, a TOTP, and a counter-based OTP.

20 Claims, 5 Drawing Sheets

OTP GENERATION USING A CAMOUFLAGED KEY

CROSS-REFERENCE TO RELATED APPLICATIONS

This application claims priority to and the benefit of U.S. Provisional Patent Application No. 61/240,010, filed on Sep. 4, 2009, which is hereby incorporated by reference in its entirety.

TECHNICAL FIELD

The present application relates to generating a one time passcode using a camouflaged key.

BACKGROUND

Symmetric key cryptography is currently used in a secure payment infrastructure to generate a one-time passcode (OTP) that can also serve as a digital signature, using a smart card and dedicated card reader hardware in a two factor authentication process. This method inconveniences the cardholder by requiring the presence of the card reader and smart card to securely host the software and keys used to generate the OTP. In a typical scenario the purchaser inserts her smart card into an unconnected reader with a pinpad, enters a PIN, and reads an OTP off a display. The purchaser types the OTP into a browser web page, or dictates it into a telephone, or otherwise conveys it to an authenticating entity. The smart card and reader are in the possession of the purchaser and are typically carried on the purchaser's person.

The "EuroPay, MasterCard, and Visa" (EMV) consortium, which develops and maintains global standards for credit and debit payment cards based on chip card technology has defined a standardized smart card, referred to as "Chipcard" to work within the EMV 3-D Secure payment infrastructure, with standardized smart card readers, cryptograms, etc. EMV Chipcards use symmetric key cryptography for signing and authentication. In an EMV system, the provisioning server and the authenticating server each have a copy of a Triple Data Encryption Standard (Triple-DES) "Master Derivation Key" or "MDK" in hardware. For each user, where the user is identified by a Primary Account Number (PAN), the provisioning server applies the MDK to the PAN and the PAN Sequence Number and generates two symmetric DES keys, which are referred to as Unique DEA Key A (UDKA) and a Unique DEA Key B (UDKB), which go into the Chipcard for that user. Note that the authenticating server can regenerate UDKA and UDKB at any time, using the user PAN information and the MDK.

Cryptographic or secure signing is possible with symmetric keys, such as the DES keys UDKA and UDKB, when the end user (through the UDKA and UDKB in the Chipcard) and the provider system (through the MDK in the provisioning and authenticating server hardware) have access to the user's symmetric key(s). Therefore, the security of the EMV system is based on the security of the authenticating and provisioning servers, the security of the Chipcard, and the secure use of the Chipcard with the card reader.

During a purchase sequence, if the user submits the right PIN to the user's chipcard, the keys UDKA and UDKB will be available for use inside the card. If the user submits several wrong PINs in a row, the card locks. The Chipcard typically collects transaction information and a random number from the server, and generates a cryptogram, called an Authorization Request Cryptogram (ARQC). The ARQC is digitally "signed" by the two DES keys (UDKA and UDKB) in the Chipcard. The data and the ARQC are sent through the card reader, which is attached to the network, to the authenticating server. The authenticating server recreates the cryptogram, and if it matches the ARQC from the client, the purchase is approved. In some systems, purchase approval may also be subject to some other checks, which may include checks of data elements inputted to the signing algorithm. The application transaction counter (ATC) is incremented on the client, e.g., the Chipcard, and the server, and the server stores the counter in a database.

In a variant on this, a passcode generating system is available in which the smart payment card is used with a disconnected reader that does not communicate with a network during an online or telephone purchase. The stand-alone reader is typically pocket-sized and has a pin pad and an LCD display. The purchaser/user/cardholder inserts the smart payment card into the reader, and inputs a correct PIN via a pinpad on the reader. An ARQC is generated in the card, but the full ARQC, which is binary, is not displayed to the user. Instead, an OTP is constructed using binary bits from the ARQC and other data elements on the card. The OTP is a decimal number of a manageable size for a human (typically 6 to 9 digits). The user views the OTP and manually types it into a web form, telephone pinpad, or speaks it during a CNP purchase or payment transaction. The authenticating server regenerates the cardholder's OTP and compares the OTP provided by the user with the regenerated OTP. Upon matching, the server authorizes the purchase transaction. In both the case of the connected card reader and disconnected reader, an ATC is incremented on the client, e.g., the card reader, and the server. The ATC is incremented each time to ensure a fresh passcode and guards against certain types of attacks, for example, a replay attack. However, the client ATC and the server ATC can get out of synchrony, inconveniencing the client by locking the card and/or card reader until the client ATC and server ATC is resynchronized, where resynchronization may require reissuance of the Chipcard and/or the card reader to the cardholder.

Visa Dynamic Passcode Authentication (DPA) and MasterCard Chip Authentication Protocol (CAP) are two initiatives (among others) derived from the EMV Chipcard specification to implement the variant just described. The EMV Chipcard user is inconvenienced when completing a transaction by the need to use a card reader either connected to the provider system or an online computer, or to use a disconnected handheld unit which must be carried by the user. In the latter case, a separate handheld unit may be required for each Chipcard type or provider. Other potential disadvantages include client-server ATC nonsynchrony and locked Chipcards resulting from incorrectly inputted PIN attempts.

SUMMARY

Certain advantages can be realized by providing the ability to securely host the software client, e.g., the one-time passcode (OTP) generating application on a variety of user handheld devices, e.g., iPhone™, Blackberry™, etc., and in JavaScript within a browser. Advantages include increased user convenience, for example, by not requiring network connectivity and/or a dedicated card reader to complete a transaction, and increased ease of resetting the ATC if out of synchrony.

A method is described herein to camouflage the keys and/or secrets, seeds or other controlled datum used in OTP generating algorithms to enable the ability to securely host the software client (OTP generating application) on a variety of user handheld devices (iPhone, Blackberry, etc.) and in JavaScript within a browser, thereby eliminating the need for a separate card reader or other dedicated hardware to protect the OTP generating algorithm and/or keys from attack.

The present method includes generating an OTP using a passcode application on a user device. The generated passcode may be a user OTP for use by the user with a provider account. The provider account may be, for example, an EMV standard Visa or MasterCard debit or credit cardholder account, or a user account with a payment system, a transaction system, an authentication system, a secure access system, or a secure data repository. The method includes providing a client passcode-generating application to a user device, and providing individualized data elements (here called a "cardstring") defined by a provider account to the passcode application. The client uses the cardstring data to generate a user one time passcode (OTP) for the provider account. The cardstring is defined by at least one camouflaged key that is camouflaged with a personal identification number (PIN).

The method may include obtaining an activation code for the provider account and providing the activation code to the passcode application to access a provisioning server using the passcode application, such that the provisioning server generates the cardstring for the provider account in response to the activation code and provides the generated cardstring to the passcode application. Providing the cardstring defined by the provider account includes generating at least one key, wherein the key which is generated is defined by the provider account. The at least one camouflaged key is camouflaged by modifying the key and encrypting the modified key with the PIN. The cardstring for the provider account is generated from the camouflaged key.

The method further includes providing the PIN to the passcode application and generating the user OTP on the user device using the passcode application and the cardstring. The method may include providing a data element to the passcode application in addition to or instead of the PIN, prior to generating the user OTP on the user device. The passcode application may use the data element to generate the user OTP. The data element may be provided by a provider system as a challenge or the data element may be an other data element, for example, transactional information such as the purchase price amount. The user OTP may then be provided to an authenticating server, for example, during a transaction involving the provider account, where the authenticating server is in communication with the provider system through which the provider account is accessed.

The user OTP is evaluated using the authenticating server; and an authorization result is provided to one of the provider system and the user. The authorization result may be, for example, a credit or debit authorization, a payment authorization, a transaction authorization, an authentication authorization, a system access authorization, or a data access authorization, as appropriate to the type of provider account for which the user OTP is generated. Evaluating the user OTP to provide an authorization result may include regenerating the user OTP using the authenticating server, and comparing the regenerated OTP and the user OTP, where, for example, the authorization is granted upon a successful matching of the user OTP and the regenerated OTP. The method may further include incrementing a user OTP counter using the passcode application and incrementing a provider OTP counter using the provider system, wherein the respective OTP counters are compared as a step in evaluating the user OTP during an authorization sequence.

The key may be configured as a symmetric key, a DES key, an AES key, a secret, a secret byte array, a seed, and a controlled datum. In a non-limiting configuration, the cardstring may be configurable as an EMV cardstring; and the key is configurable as one of a UDKA and a UDKB key. In another non-limiting configuration, the cardstring may be configurable as an OTP cardstring, and the key is configurable as a secret configurable to generate one of a HOTP (a standardized counter-based OTP), a TOTP (a time-based OTP), or other OTP.

The method may further include providing another, e.g., a second cardstring to the passcode application, wherein the second cardstring is configured to generate another, e.g., a second passcode configured as a user OTP for another, e.g., a second provider account. The second cardstring may be defined by at least another key camouflaged with another, e.g., a second PIN, such that by providing the second PIN to the passcode application a user OTP for the second user account may be generated on the user device using the second cardstring.

A system is also disclosed herein for providing an OTP from a user device. The system can be used with a provider account. The system includes a user device configured to receive a passcode application, a PIN and a cardstring, and further includes a provisioning server configured to provide the cardstring and the passcode application to the user device. The user may access the passcode application on the user device which uses the cardstring and the PIN to generate the user OTP for the provider account. The cardstring may be defined by at least one key, wherein the at least one key is camouflaged with the PIN and is defined by the provider account. The camouflaged key may be configured as a modified key encrypted with the PIN, wherein the key prior to modification is a one of a symmetric key, a DES key, an AES key, a secret, a secret byte array, a seed, a controlled datum, a UDKA key and a UDKB key. The cardstring may be configured as an EMV cardstring or as an OTP cardstring.

The passcode application may be configured to execute at least one passcode generating algorithm configurable to generate one of an EMV OTP, a HOTP, a TOTP, and a counter-based OTP. The passcode application may be configured to receive a data element and to use the data element to generate the user OTP. The data element may be a challenge provided by the provider system. The provider system may include, for example, the provisioning server, a transactional server, and an authentication server. The provider system may provide the functions of the provisioning, transactional and authentication servers on a combined server or on multiple servers in a distributed system. The authenticating server may be configured to receive the user OTP and to provide an authorization result to one of a provider system and the user. The system may further include a user OTP counter which may be incremented by the passcode application, and a provider OTP counter which may be incremented by the provider system.

In a non-limiting example, a method is provided herein for camouflaging symmetric keys, and a process is provided to securely host an OTP generating software client including camouflaged symmetric keys on a variety of user handheld devices (iPhone, Blackberry, etc.) to generate OTPs to secure transactions within a smart card payment system, such as the EMV 3-D Secure Infrastructure.

In another non-limiting example, a method is provided for camouflaging a controlled datum, by example, a secret byte array, and to securely host an OTP generating software client including a camouflaged secret byte array on a variety of user handheld devices (iPhone, Blackberry, etc.) to generate OTPs to authenticate a user to a secured server to provide the user with access to restricted contents or services.

DETAILED DESCRIPTION

Certain advantages can be realized if a one-time passcode (OTP) can be provided to a user without requiring dedicated hardware such as a connected or stand-alone smart card reader to generate the OTP for each of the user's Chipcards or provider accounts. The ability to securely host the software client, e.g., an OTP generating application, on a variety of user handheld devices such as an iPhone or a Blackberry, and in JavaScript within a browser, would increase user convenience, for example, by not requiring network connectivity or a dedicated reader, support OTP generation for multiple smart card accounts on a single device, and increase ease of resetting an ATC if out of synchrony. The present application provides a method to camouflage keys, including symmetric keys, and a process to securely host the OTP generating software client including the camouflaged symmetric keys, on a variety of user handheld devices and in JavaScript within a browser, such that the user device is configurable to securely generate a user OTP.

Figure 2:
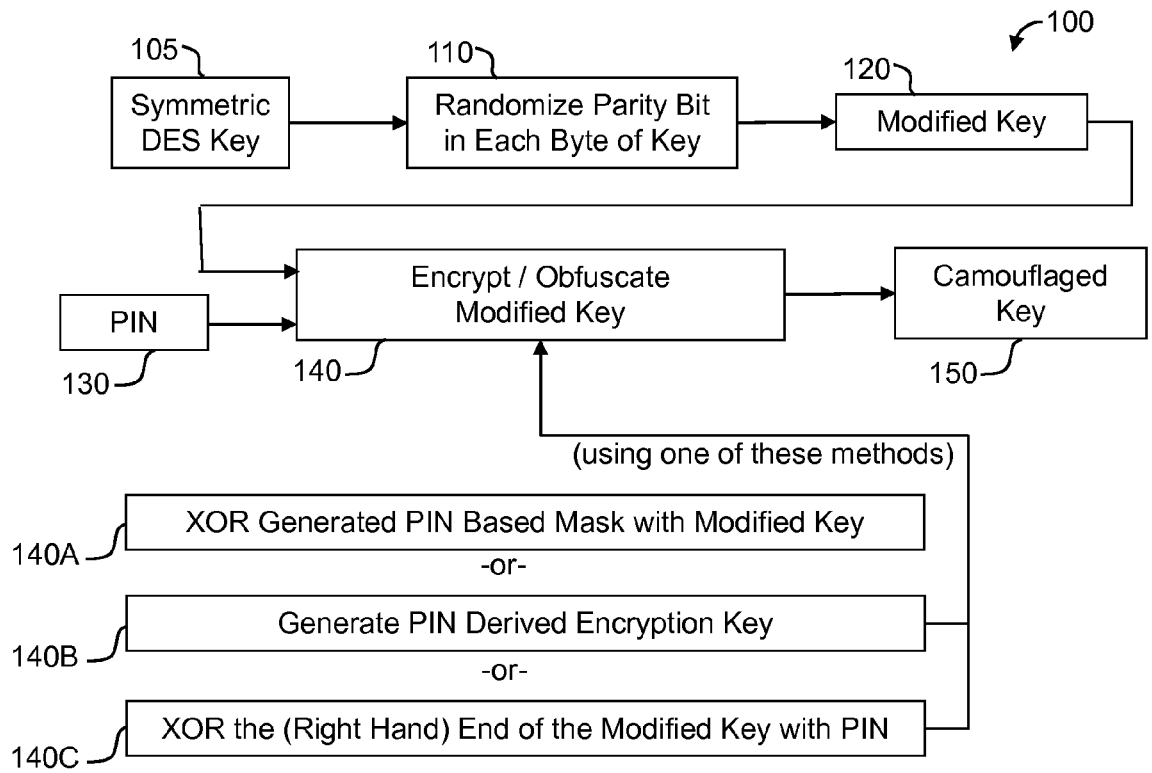
FIG. 2 is a schematic illustration of process of symmetric key camouflaging.

The method and system described herein uses cryptographic camouflaging, as described in the non-limiting example shown in FIG. 2, to secure the symmetric DES keys (UDKA and UDKB) of the EMV method, thereby retaining the two factor strength of the smart card solution without the need for client hardware, such as a POS or Chipcard card reader, to protect the ARQC and OTP generating algorithm. The camouflaging scheme may be configured to provide a plausible key, that is, a key which is different but indistinguishable from a correct key, to an attacker in response to an incorrect PIN input. As a result, an attacker may use this plausible key with a service provider system where the service provider system may be configured to detect input of the plausible, but incorrect key as an intrusion, triggering intrusion detection systems which may result in thwarting or catching the attacker.

The software client, hereinafter also referred to as the OTP generating software or application, or the passcode application, is configurable to run on a variety of handheld devices (iPhone, Blackberry, etc.) and in JavaScript within a browser. The required data elements are stored in the database or file system of the user device, or in a cookie (or Adobe Flash movie) in the case of JavaScript. The OTP generating software client includes two parts: the algorithm, and the data elements, which may include the keys and/or secrets used to generate the OTP, which are provisioned together in the passcode application on the user device, and described in further detail herein.

Figure 1:
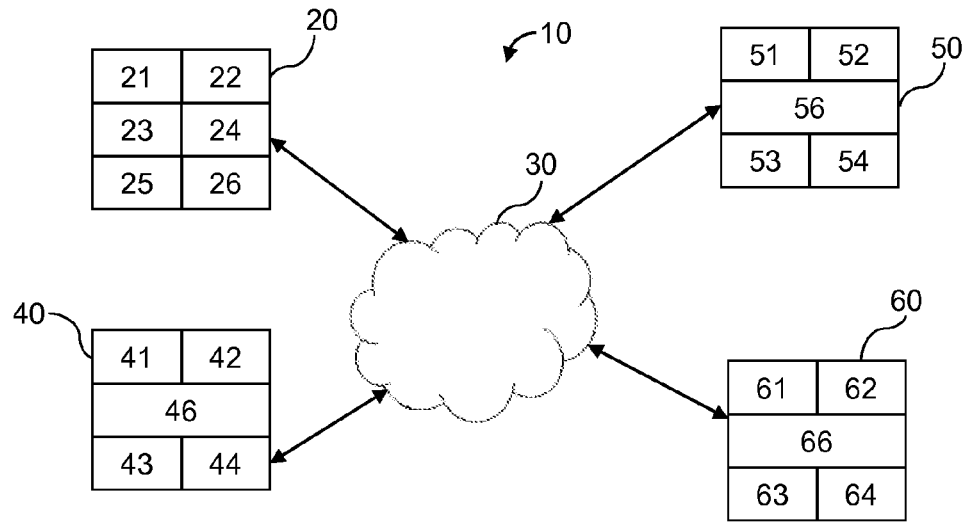
FIG. 1 is a schematic illustration of a system for providing an OTP using a user device.
Figure 3:
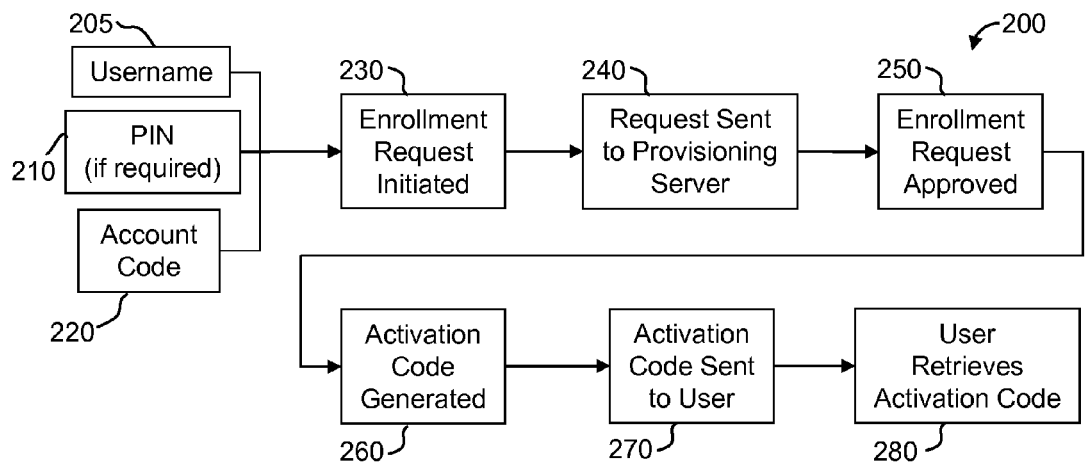
FIG. 3 is a schematic illustration of an activation process.
Figure 4:
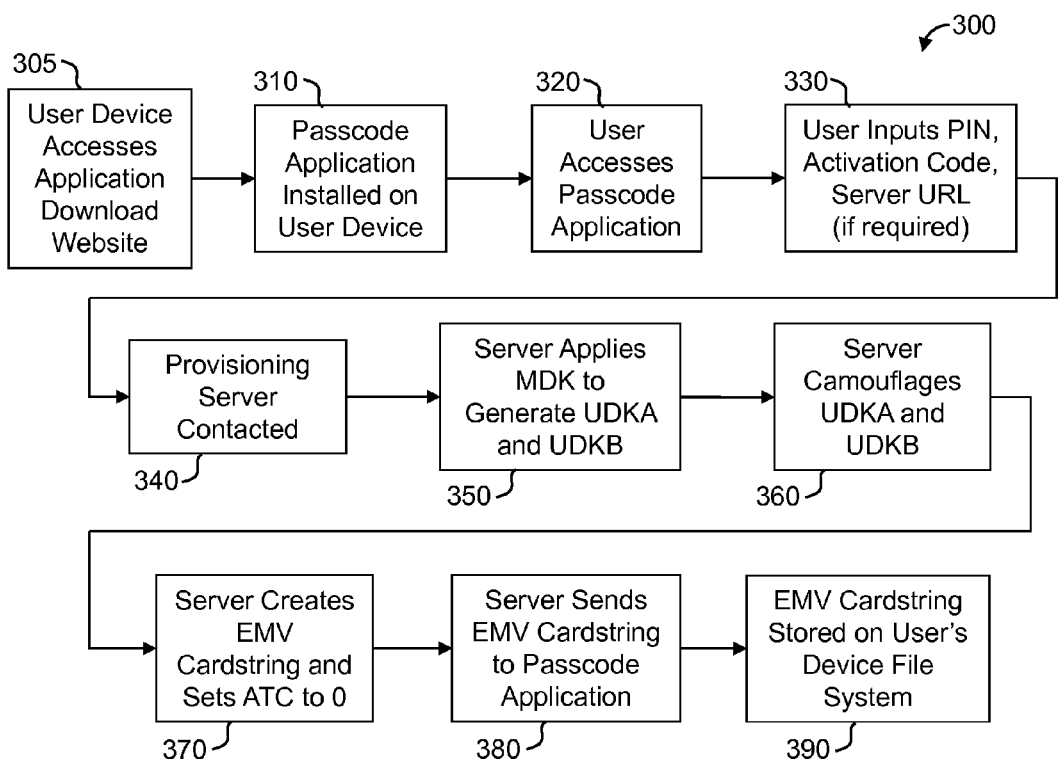
FIG. 4 is a schematic illustration of a process to provide a camouflaged EMV cardstring capable of generating an OTP to a user device.
Figure 5:
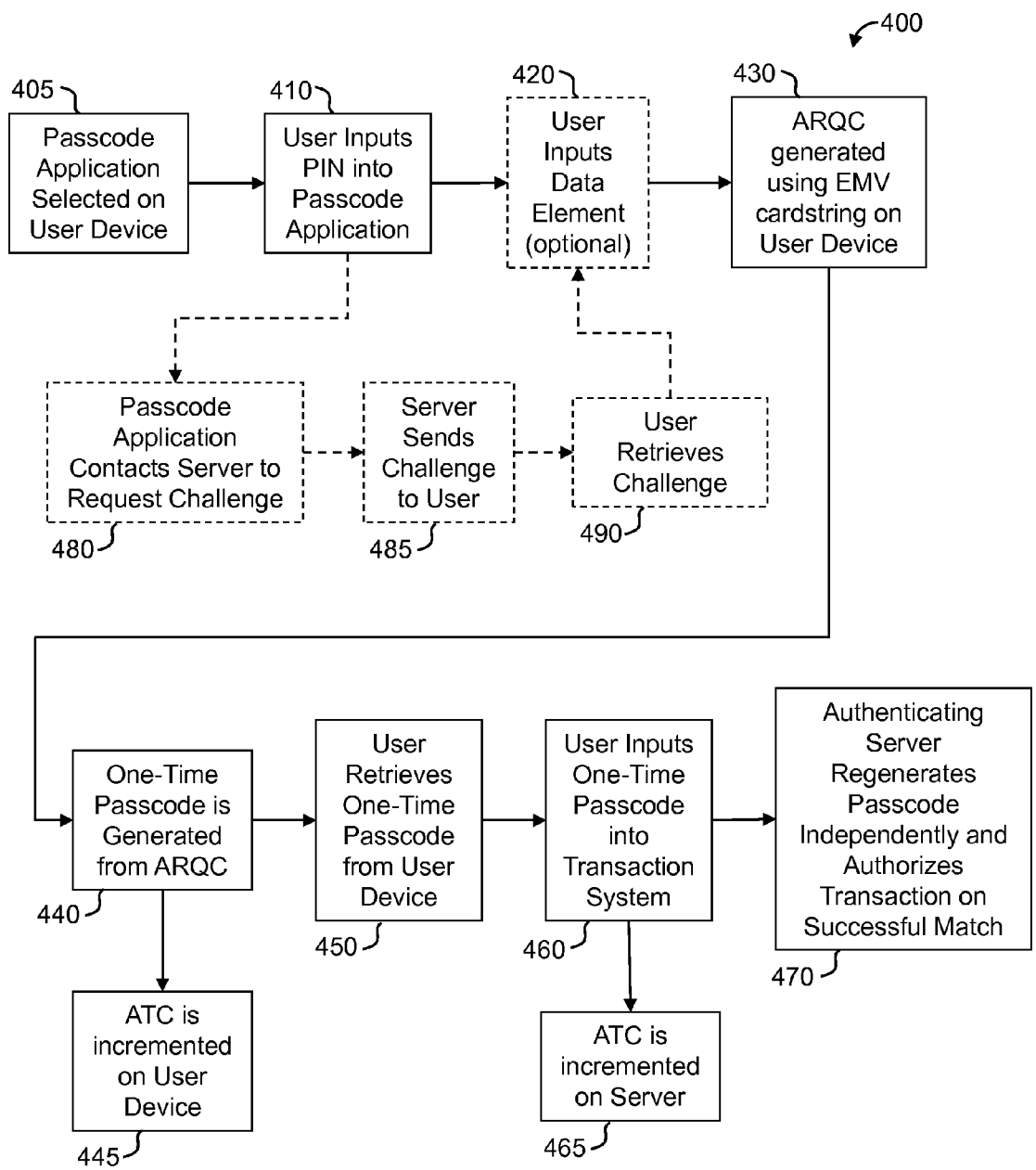
FIG. 5 is a schematic illustration of a process to obtain, from a user device, an OTP to authorize a transaction.
Figure 6:
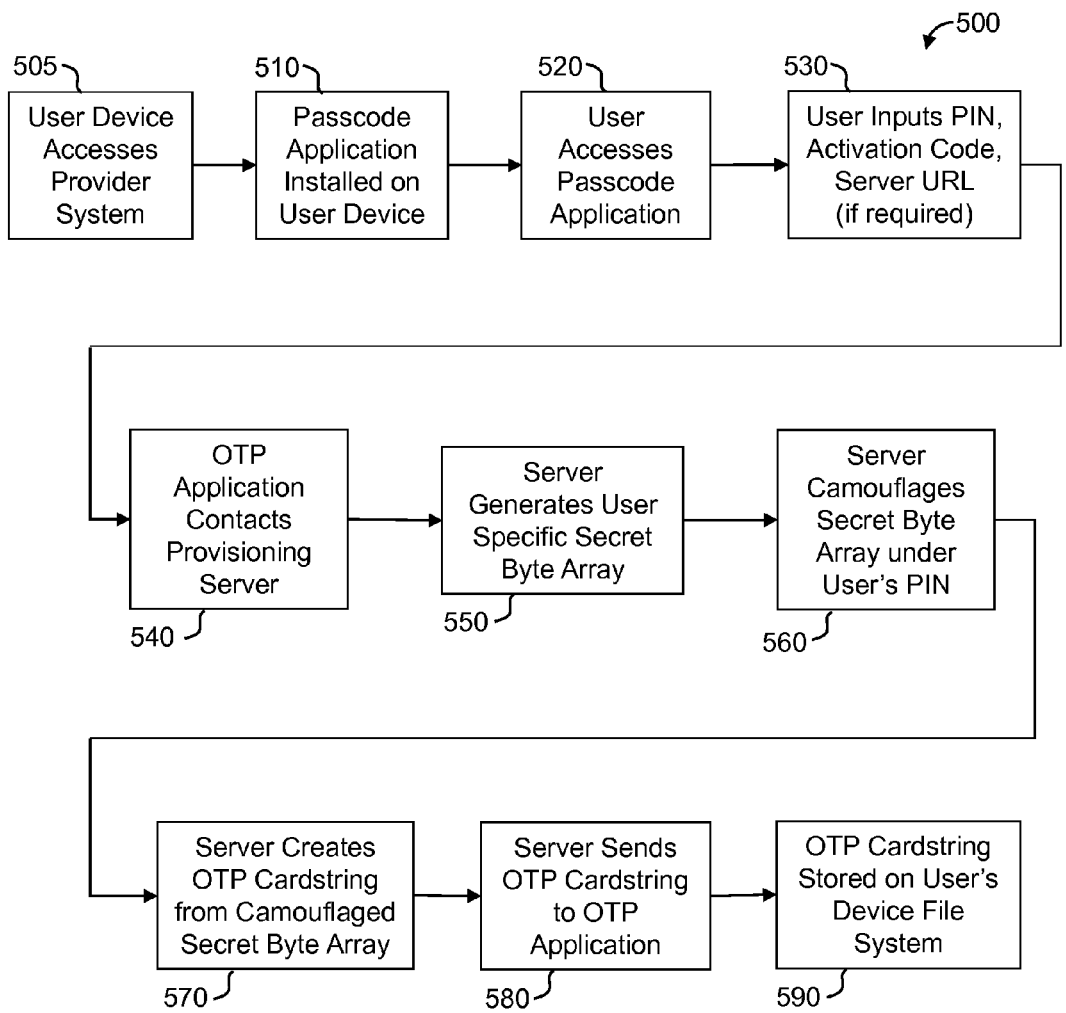
FIG. 6 is a schematic illustration of a process to provide a camouflaged OTP (one time passcode) cardstring capable of generating an OTP to a user device.
Figure 7:
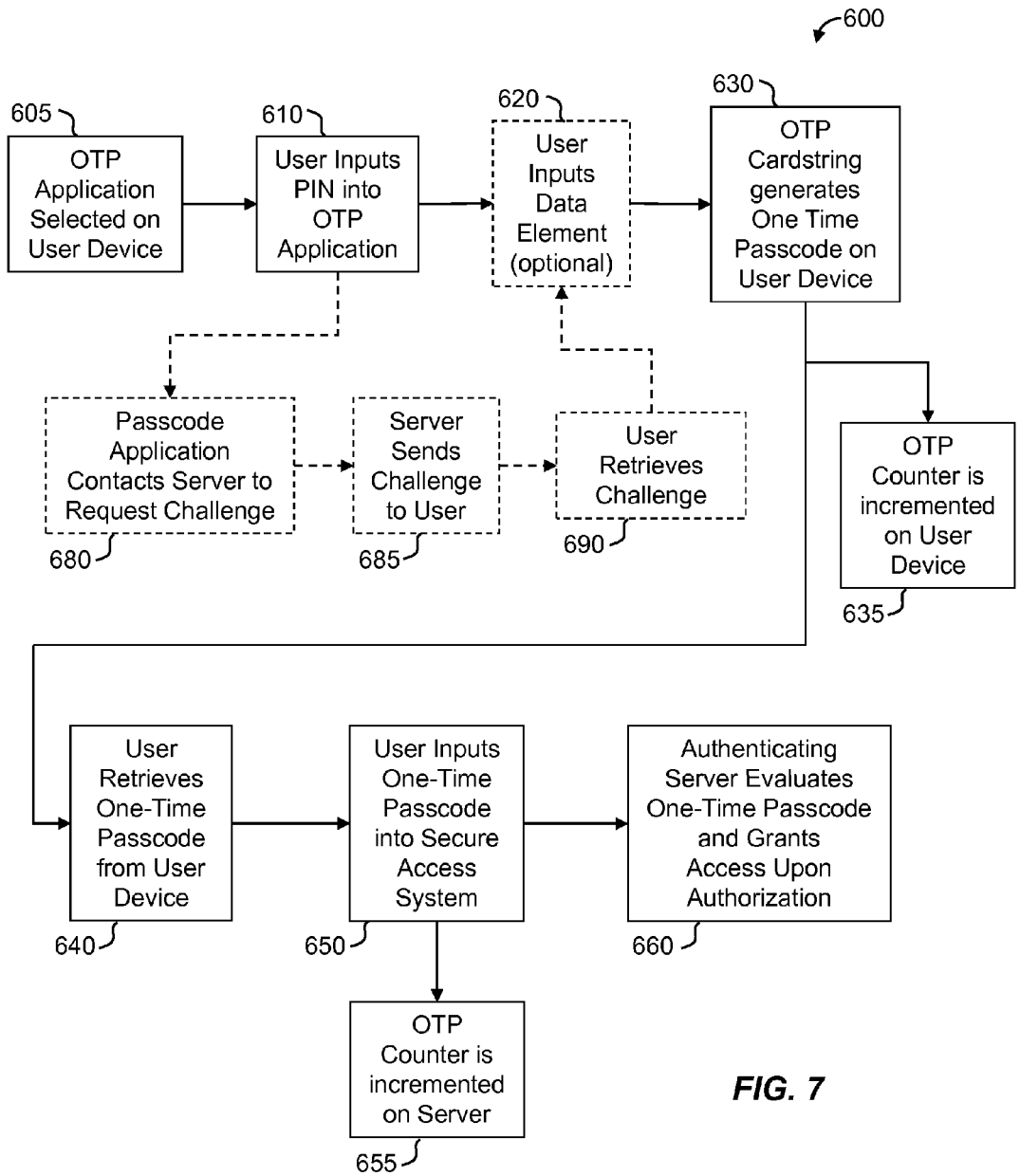
FIG. 7 is a schematic illustration of a process to obtain an OTP from a user device to access a secure system.

The OTP generating passcode application is enabled on the user device through many variant provisioning methods, using, for example, a system configured as system 10 shown in FIG. 1, a camouflaging method shown in FIG. 2, an enrollment method shown in FIG. 3, an activation method shown in FIGS. 4 and 6, a usage method shown in FIGS. 5 and 7, or a combination thereof. For example, in a typical provisioning method, the user/cardholder will install or download the passcode application to a user device without the data elements, wherein the data elements may include, for example, an OTP generating cardstring defined by a camouflaged key or secret which is specific to the user account or card and identifiable thereto. During an activation interaction with a provisioning server, the user will download the data elements including user specific data elements which may be, in a non-limiting example of an EMV standard Chipcard, the UDKA and UDKB for the user's debit or credit card, or in another non-limiting example, a secret byte array specific to a user's provider account for secure access. These individualized data elements are camouflaged and encoded into a single string, referred to as a "cardstring," which may also be referred to as an EMV cardstring or an OTP cardstring, prior to being provided to the passcode application. The cardstring is typically configured of human-readable ASCII characters. The cardstring data is used with a PIN and the passcode application to generate a user OTP.

Referring to the drawings, wherein like reference numbers correspond to like or similar components throughout the several figures, there is shown in FIG. 1 a schematic illustration of a system 10 for providing a user OTP using a user device 20. The system 10 includes a transactional or provider system 40, a provisioning server or system 50, and an authenticating server or system 60, which are each configured to communicate with a network 30, which may be, for example, the Internet.

The user device 20 may be a user device such as a mobile phone, a personal digital assistant (PDAs), a handheld or portable device (iPhone, Blackberry, etc.), a notebook, personal computer, note pad or other user device configured for mobile communications, including communication with network 30. Mobile device 20 is configured to communicate with the network 30 through an interface 21, which may be a modem, mobile browser, wireless internet browser or similar means suitable for accessing network 30. The user device 20 may be further configured with a passcode application 26 which may include one or more algorithms configurable to generate an OTP using a cardstring or other key or secret which may be provided to passcode application 26 or stored in a database or file system 24 on user device 20. The user device 20 further includes a memory 23 and a central processing unit (CPU) 22. The memory 23 of device 20 can include, by way of example, Read Only Memory (ROM), Random Access Memory (RAM), electrically-erasable programmable read only memory (EEPROM), etc., of a size and speed sufficient for executing one or more algorithms included in application 26 activated on user device 20. User device 20 is configured to provide an input/output 25 which may be configured, for example, as a keypad and display, a touch screen, or a combination thereof configurable to display, for example, a menu, a generated OTP, a challenge or other information associated with passcode application 26, information input into or received by device 20 such as information provided through or selected from input/output 25.

The transaction or provider server 40 may be configured with interface 41, which may be a modem, browser or similar means suitable for accessing network or internet 30. Interface 41 may be configurable to communicate with one or more authenticating and/or provisioning systems, for example, provisioning server 50 and authenticating server 60, through network 30 or directly without accessing network 30, where the accessible provisioning and authenticating server(s) 50, 60 may be a hosting system for provider server 40 or vice versa. The provider server 40 may correspond to a provider which may be a bank or other financial institution engaged in issuing, for example, EMV standard Visa or MasterCard debit and/or credit cards and processing payments associated therewith. Provider 40, in a non-limiting example, may be a merchandiser or service or utility provider which utilizes EMV standard Visa or MasterCard payment systems to conduct business. In another non-limiting example, provider 40 may be a provider of services or transactions which require a user or provider account holder to securely access the provider system, to be authenticated to the provider system, or to provide secure authorization to the provider to conduct transactions.

The provider server 40 is configurable to communicate with network 30 through a provider interface 41, for example, a provider website. Provider system 40 is configured with a CPU 42 and a memory 43, and may include a passcode application 46 which may be configurable to generate OTPs, keys, secrets or other data elements, which may be stored in a database or file system 44. The memory 43 of system 40 can include, by way of example, ROM, RAM, EEPROM, etc., of a size and speed sufficient for conducting provider transactional, provisioning, authorization and authentication processes or other tasks and processes related to OTP based methods, and for configuring, providing and/or activating algorithms, keys, secrets, and other data elements related to provider accounts, or to the methods and systems described herein.

System 10 may further include a provisioning server 50 which is configurable to communicate with the network 30 through a server interface 51. As discussed previously for server 40, provisioning server 50 is configured with a CPU 52, a memory 53 and a database or file system 54. Provisioning server 50 may include a passcode application 56 which may be configured to generate and/or provide activation codes, OTP generating algorithms, secrets, keys, cardstrings, account information and data elements as described herein, and may further be configured to camouflage datums including secrets and keys which may be symmetric keys. The memory 53 of system 50 can include, by way of example, ROM, RAM, EEPROM, etc., of a size and speed sufficient for conducting provisioning, transactional, authorization and authentication processes or other tasks and processes as described herein.

System 10 may further include an authenticating server 60 which is configurable to communicate with the network 30 through a server interface 61. As discussed previously for server 50, authenticating server 60 is configured with a CPU 62, a memory 63 and a database or file system 64. Authenticating server 60 may include a passcode application 66 which may be configured to generate and/or provide activation codes, OTP generating algorithms, secrets, keys, cardstrings, account information and data elements as described herein, and may further be configured to evaluate and authenticate user OTPs and to independently generate user OTPs for a provider account, for comparison with an inputted user OTP, for example, to determine and provide an authorization result, which may be, for example, approval or denial of a payment transaction or request for secure access. The memory 63 of system 60 can include, by way of example, ROM, RAM, EEPROM, etc., of a size and speed sufficient for conducting provisioning, transactional, authorization and authentication processes or other tasks and processes as described herein. It would be understood that the provider system may comprise the provider or transactional server 40, the provisioning server 50 and the authenticating server 60, in communication with each other, or otherwise configured, for example, such that the transactional, provisioning and authenticating processes may be commonly hosted on one or more shared servers.

FIG. 2 shows a schematic illustration of a method 100 to cryptographically camouflage a software key. At step 105, a symmetric key is provided to a camouflaging process. In the non-limiting example shown in FIG. 2, the key provided at step 105 may be of any symmetric key type, for example, the key may be a Data Encryption Standard (DES) key which is provided for camouflaging under a PIN. The DES key is of size 8 bytes. In each byte, bits 2 through 8 are random, and the first bit is a parity bit which is the parity of bits 2 through 8. In step 110, the parity bit in each byte of DES key 105 is randomized, to produce a modified key at step 120. A PIN is provided at step 130, and the modified key is encrypted or obfuscated at step 140 using the PIN, to provide a camouflaged key at step 150.

The method of encryption used at step 140 may be one of various methods. By way of non-limiting example, three possible methods 140A, 140B, 140C are shown in FIG. 2. Method 140A uses a Mask Generation Function to create a mask from PIN 130 and XOR (Exclusive OR) the mask with the modified key to provide a camouflaged key at step 150. Method 140B encrypts the modified key with a new key derived from the PIN to provide a camouflaged key at step 150. When using method 140B, no padding or other information should be stored that can help an intruder recognize a failed decryption attempt with a wrong PIN, e.g., a PIN other than the PIN provided at step 130. A third possible method 140C provides XOR the (right hand) end of the modified key with the PIN to provide a camouflaged key at step 150. While three possible methods are described herein to encrypt or obfuscate a modified key to provide a camouflaged key, it is understood that various alternative methods and embodiments can be employed for encrypting a modified key to provide a camouflaged key.

Note that an attacker using a brute force attack with all possible PINs, and with full knowledge of the camouflage algorithm used at step 140, will always produce a validly formatted DES key, except for the parity bits. The attacker has no way of recognizing when the correct PIN was used. A crucial feature of the method of camouflage described herein is that structure, if any, should be removed from the datum to be encrypted/obfuscated. This applies to the parity bits, in the case of DES keys, as described for the embodiment shown in FIG. 2. However, it is understood that a camouflaging technique based on the method described in FIG. 2, e.g., a combination of modifying a key and encrypting or obfuscating the modified key using a PIN can be used for any other standard symmetric key, for example, an Advanced Encryption Standard (AES) key. It is further understood that a camouflaging technique based on the method described in FIG. 2, e.g., a combination of modification of the structure of the secret or datum with the encryption or obfuscation of the modified secret or datum to provide a cryptographically camouflaged secret or datum can be applied to any type of secret or datum, including a key generated from a seed, where in the latter event, the seed may be camouflaged to secure the datum.

Alternatively, it is understood that providing a camouflaged datum or key could include providing a large set of keys, for example, numbering several million, when a PIN could be used to select a camouflaged key based on a PIN derived index.

FIG. 3 shows a representative provisioning implementation or enrollment sequence 200. At step 230, a user cardholder or provider account owner initiates an enrollment request with the card issuer or account provider, through a provider interface which may be, for example, provider system 40, a provisioning server 40 via, for example, a network 30. The user may initiate the enrollment request at step 230 in person, by telephone, mail or through other suitable methods sufficient to initiate the enrollment request with the provider, and to provide or establish, as required, a username 205, PIN 210 and user account code 220. The enrollment request is provided to a provisioning server 50 at step 240 via a network 30 or directly, for example, through a provider system such as server 40 in direct communication with the provisioning server 50. The provisioning server 50 is provided with, or may be required to create a username 205, a PIN 210, and account code 220 associated with the user account. The account code provided at step 220 may be the cardholder's PAN, or Primary Account Number, in the non-limiting example of the EMV Chipcard enrollment sequence shown in FIG. 3. The account code 220 may be a number other than the PAN, as required by the provider specific enrollment system. At step 250 the enrollment request is approved and the provisioning server 50 generates an activation code at step 260 which is provided as a strong activation code to the user cardholder at step 270 by a secure method, which may be by email, text or short message service (SMS) message, mail, or telephone, for example. The activation code is defined by or identifiable to the user cardholder or the user's provider account. The user retrieves the activation code at step 280.

FIG. 4 provides a schematic illustration of an activation sequence 300, to activate the passcode application 26 on a user device 20. Beginning with step 305, the user cardholder accesses the provider system, for example, by accessing the provisioning server 50 via the network 30 using the provider account owner or cardholder user device 20. (See FIG. 1) At step 310, the passcode application 26 is provided to and installed on the user device 20. The user accesses the installed passcode application 26 at step 320 by selecting "Activate Card Passcode" or "Activate Account Passcode" or similar, from a passcode application menu.

The user, at step 330, inputs the PIN, the activation code retrieved in step 280, and the provisioning server URL (if required and not provided by default) to the passcode application 26. At step 340, the passcode application 26 contacts the provisioning server 50 and provides the user inputted information. At step 350 the server applies a provider MDK to the user PAN to generate account specific UDKA and UDKB keys which are individualized to the user's account. The server 50, at step 360, camouflages at least one of the UDKA and UDKB keys under the user's PIN, using, for example, one of the cryptographic camouflaging methods described for FIG. 2.

At step 370, the server 50 encodes the camouflaged UDKA and UDKB keys into a single string referred to as a "cardstring" or as an "EMV cardstring." The server sets the client ATC and the server ATC to 0. At step 380, the server sends the EMV cardstring to the passcode application 26 on the user device 20. At step 390, the passcode application 26 stores the EMV cardstring in the user device file system 24. The activation sequence may further include, for example, updating a menu in the passcode application to display the account OTP generator as a selectable option from the passcode application 26 menu on user device 20.

A usage process 400 to provide a user OTP for an EMV Chipcard is illustrated in FIG. 5. In the non-limiting example shown, the device 20 is configured with the passcode application 26, which is also referred to as an OTP generating application, and the camouflaged EMV cardstring corresponding to the user's Chipcard account has been provided to the user device 20 during the activation sequence shown in FIG. 4. The user, at step 405, selects the passcode application 26 on the user device 20 and if required, selects the account or card for which a user OTP is being requested. At step 410, the user inputs the user PIN into the passcode application 26, and if required, the user provides a data element at step 420, described in detail herein.

At step 430, the passcode application 26 uses the PIN and the camouflaged EMV cardstring to generate an ARQC. At step 440, an OTP is generated using the ARQC, and at step 445 the ATC is incremented in the user device file system 24. The user, at step 450, retrieves the OTP from the device 20 and inputs the OTP at step 460 into the transaction system, for example, by typing it into a website, a user device, a phone system, or providing it verbally. The transaction system, which may be, for example, in communication with a transaction server 40 of the provider system (see FIG. 1), upon receipt of the passcode and other inputted information, for example, the user's Chipcard number, which may be the PAN, increments the ATC in the provider system at step 465. The authentication server 60, at step 470, may regenerate the user OTP independently and compare the regenerated OTP with the user OTP generated by the passcode application provided by the user device 20. Upon successful match, the provider system authenticates the OTP and grants approval and authorization for the payment transaction.

While the embodiment shown in FIG. 5 is for a Chipcard payment transaction using EMV protocol, it is understood that a generally similar system could be used for other transactional processes or authorizing and authenticating systems which may or may not be EMV compliant. It is further understood that the controlled access datum or key which is cryptographically camouflaged and subsequently used to provide the EMV cardstring may be something other than a symmetric key, may be other than a DES or AES key, or may be a non-symmetric key, a secret, or a seed and indexed key list, as described herein.

FIG. 5 shows other variants of the transaction authorization process which may be used within the method described herein. For example, FIG. 5 shows at step 480, the passcode application 26 contacting the provider system to request a challenge. The provider system sends the challenge to the user at step 485, by a predetermined process, for example, through an email, a text or SMS, or via a phone call or voicemail. The user retrieves the challenge at step 490, and at step 420 inputs the challenge into the passcode application 26 as a required data element. The OTP generating process may use the challenge in the ARQC generation sequence at step 430, or at the OTP generating step at 440. Optionally, the user may be required, at step 420, to input a different data element, for example, a secondary PIN or the amount of the purchase transaction for comparison in the authentication process at step 470. Alternatively, the user may input a data element which may be configured as a message to the provider system, for example, an alarm or alert code at 420, notifying the server to provide a non-valid user OTP or to terminate all authorization until reactivated, for example, in the event of a stolen user device or a personal security threat to the user.

The user may repeat the enrollment sequence and activation sequence of FIGS. 4 and 5 for more than one Chipcard account or provider account, such that the user may store a plurality of EMV cardstrings for multiple payment cards and PANs, and for payment cards from different issuers or providers, in the passcode application 26 on user device 20, thus eliminating the need for carrying or connecting multiple card readers, or at minimum, a card reader for each major card type (Visa, MasterCard, American Express). The passcode application may be provided with a plurality of passcode generating algorithms. By way of non-limiting example, the passcode application may be provisioned with a passcode generating algorithm configurable to generate a Visa DPA passcode, and another algorithm configurable to generate a MasterCard CAP passcode.

The passcode application may be provisioned with a plurality of cardstrings, where each of the cardstrings may be configured for each of a plurality of user accounts, e.g., each cardstring may be defined by a specific user account, such that it is generated by a specific camouflaged key or secret. The key or secret associated with each account cardstring may be of a different type. For example, a first cardstring useable to generate a user OTP for a first provider account may be derived from a first secret byte array, and a second cardstring useable to generate a user OTP for a second provider account may be derived from and identifiable to a set of UDKA and UDKB keys defined by an EMV payment card. The first cardstring may be used with a HOTP algorithm, and the second cardstring may be used with an EMV algorithm. A third cardstring may be derived from a second secret byte array, however may use the same HOTP algorithm as the first secret byte array to generate a user OTP for the third provider account. Each of these cardstrings will be associated with a PIN, where the PIN for each may be different, or as selected by the user or otherwise configured, may be the same PIN for additional user convenience.

The passcode application and methods described herein may be used to generate an OTP to authenticate a user to a provider server or to a provider account, to provide a user OTP to access restricted contents or services or to authorize a transaction, which may be a payment or a non-payment transaction. The passcode application and cardstring may be provisioned to provide a user OTP for user authentication and access authorization, with the strength of two-factor authentication however without the inconvenience of additional hardware such as the RSA keyfob system, or additionally requiring online access to obtain a passcode value. Referring again to FIG. 2, the key which is provided at 105 to be camouflaged in a secured access scenario may be a controlled access datum used in conjunction with the protected server or system, and may be configured other than a symmetric DES key. The controlled access datum provided in step 105 may be a key, a secret, a secret byte array or a seed and indexed key list, for example, or a datum suitable for use with an OTP generating algorithm, such as a HOTP or TOTP algorithm. If the key provided at step 105 were a datum other than a DES key, the datum would be modified such that the structure of the datum would be removed, to provide a modified datum at step 120.

Referring now to FIG. 3, the account code 220 provided to the enrollment sequence for a passcode application configured to provide a user OTP for secure access or authentication may be a provider account code identifying the user to the provider system, server or network, or may be a user account, a user identification number, or, by way of non-limiting example, an employee number for access to a secure employer system.

FIG. 6 illustrates an activation sequence 500 where the system and methods including the passcode application may be configured to generate an OTP configured for secure access or authentication or otherwise configured as a user OTP for use with a non-EMV payment system or other non-EMV provider system. In the non-limiting example shown in FIG. 6, and similar to the activation process as described for FIG. 4, the activation sequence 500 for an OTP generating passcode application 26 on a user device 20 (see FIG. 1) begins at step 505, where the user accesses the provider system, for example, by accessing a provisioning server 50 through the network 30 using the user device 20. The user may provide an authorization code obtained through an enrollment sequence from the provider, using a method such as the method shown in FIG. 3 and described previously.

At step 510, a passcode application 26 is provided to and/or installed on the used device 20. The passcode application 26 may include one or more OTP generating algorithms, which may be configured, for example, as one or more of a HOTP algorithm, a TOTP algorithm, a counter-based algorithm or other Internet Engineering Task Force (IETF) standard algorithm configurable to generate a user OTP for a provider system. At step 520, the user accesses the passcode application 26 on the user device 20, and if required selects a provider account for which a user OTP is requested. At step 530, the user inputs the PIN, the activation code obtained from the provider system for the user's provider account from the enrollment sequence shown in FIG. 3, and, if required, a server URL or other address to access the provider system, or, for example, a provisioning server 50 thereof.

At step 540 the passcode application 26 contacts the provisioning server 50, and provides the user inputted information to the provisioning server 50, including, for example, the activation code. The server 50, at step 550, generates a user specific secret byte array wherein the secret byte array, secret, or key, is defined by or identifiable to the user's provider account. The secret, at step 560, is camouflaged using the method as described previously herein for FIG. 2. The secret is modified and the modified secret is encrypted under the user PIN, to provide a camouflaged secret.

At step 570, the camouflaged secret is encoded into a single string referred to as a cardstring, or as an OTP cardstring. The OTP cardstring is defined by the camouflaged secret and is thereby identifiable to the user or provider account. At step 580, the server 50 provides the OTP cardstring to the passcode application 26 on the user device 20, where it may be stored, at step 590, in a database or filed system 24 on the user device 20. The passcode application is configured to use the OTP cardstring to generate a user OTP for the provider account.

FIG. 7 shows a process 600 to use the OTP application to obtain a user OTP which is similar to the process 400 of FIG. 5 used to generate an OTP for an EMV Chipcard, and with similar benefits and advantages. The user, at step 605, selects the passcode application 26 on the user device 20 and if required, selects the account or card for which a user OTP is being requested. At step 610, the user inputs the user PIN into the passcode application 26, and if required, the user provides a data element at step 620, described in detail herein. At step 630, the passcode application 26 uses the PIN and the camouflaged OTP cardstring to generate a user OTP. At step 635 the ATC is incremented in the user device file system 24.

The user, at step 640, retrieves the OTP from the device 20 and inputs the OTP at step 650 into the secure access system. The secure access system, which may be, for example, a provider server 40 of the provider system (see FIG. 1), upon receipt of the passcode and, if required, other inputted information or data elements, for example, the user's account number or identification number, increments the ATC in the provider system at step 655. The authentication server 60, at step 660, evaluates the user OTP, which may include regenerating the user OTP independently and comparing the regenerated OTP with the user OTP generated by the passcode application provided by the user device 20. Upon successful match or authentication, the provider system authenticates the OTP and grants authorization to the user, for example, to access the secure system or secured data.

FIG. 7 shows other variants of the transaction authorization process which may be used within the method described herein. For example, FIG. 7 shows at step 680, the passcode application 26 contacting the provider system to request a challenge. The provider system sends the challenge to the user at step 685, by a predetermined process, for example, through an email, a text or SMS, or via a phone call or voicemail. The user retrieves the challenge at step 690, and at step 620 inputs the challenge into the passcode application 26 as a required data element. The OTP generating process may use the challenge in the OTP generation sequence at step 630. The system and method illustrated by FIGS. 6 and 7 provide, rather than an EMV OTP to authorize a payment transaction, an OTP to authenticate a user to a provider network or system, to provide access to secured data, or to authorize a transaction which may be a financial or non-financial transaction, by way of non-limiting example.

As described previously, the advantages of the processes described herein are numerous. The ATC can be reset through the passcode application 26 downloaded on the user device 20, by the user manually or through application-server communication enabled by the user device 20, eliminating the inconvenience of replacing the Chipcard in the event of ATC nonsynchrony. The passcode application 26 can be updated automatically and without the need to replace hardware, as may be required with a card reader. The passcode application 26 can be downloaded and activated on multiple user devices for the same PAN or user account. As an example, for a joint account, the passcode application 26 could be activated on both of the joint cardholder's user devices, which also could be of different types, for example, an iPhone and a Blackberry, with transparency to either user. In another example, and in the event of multiple incorrect PIN inputs, resetting of the passcode application can be expedited through a support telephone call and a reset of the passcode application on the user device, which can, if necessary, include providing a new cardstring.

Additionally, the processes described herein, using capabilities enabled by cryptographic camouflaging, provide the advantage of intrusion detection. Intrusion detection is not provided by the conventional Visa DPA or MasterCard CAP systems, or by the card reader dependent EMV process, generally, where if the user inputs the incorrect PIN multiple times, the user's Chipcard will lock and become unusable, inconveniencing the user by requiring the user to procure a replacement card. Using the methods and systems described herein, if the user inputs an incorrect PIN, instead of locking the card, two plausible UDKA and UDKB could be released, such that the intruder might try to employ these in some applications and hence get caught, e.g., the intruder will be detected. As a result, OTP generation using a cardstring derived from a camouflaged key offers a higher level of security against an intruder.

While the above processes are described in detail with respect to transactional systems, including payment systems, and secure access systems, such as enterprise server authentication systems, those skilled in the art will recognize the broader applicability of the claimed invention to securely provide, through a user handheld device such as, for example, an iPhone or Blackberry, an OTP generated from a cryptographically camouflaged datum, where the datum may be of various types, including but not limited to, for example, symmetric keys, non-symmetric keys, secrets, seeds and indexed key lists. Those having ordinary skill in the art will further recognize that terms such as "encrypt," "obfuscate," "key," "PIN," "server," "website," "code," "challenge," etc., are used descriptively of the figures, and do not represent limitations on the scope of the invention where other terms may be used in a generally equivalently descriptive manner.

While the best modes and other embodiments for carrying out the claimed invention have been described in detail, those familiar with the art to which this invention relates will recognize various alternative designs and embodiments for practicing the invention within the scope of this application and the appended claims.

The invention claimed is:

1. A method of generating a user one-time passcode (OTP) for a provider account, the method comprising:
   providing a passcode application to a user device;
   providing a cardstring to the user device, wherein:
      the cardstring is defined by the provider account, and
      the cardstring includes at least one key that is a modified key camouflaged with a personal identification number (PIN);
   wherein the passcode application is operable to generate a passcode configured as a user OTP for the provider account using the cardstring in combination with the PIN;
   providing the PIN to the passcode application; and
   generating the user OTP on the user device using the passcode application, the PIN and the cardstring to generate the user OTP.

2. The method of claim 1, wherein providing the cardstring to the passcode application further comprises:
   obtaining an activation code for the provider account;
   providing the activation code to the passcode application;
   accessing a provisioning server using the passcode application;
   providing the activation code to the provisioning server;
   generating the cardstring using the provisioning server; and
   providing the cardstring to the passcode application using the provisioning server.

3. The method of claim 1,
   wherein:
   the at least one key includes a first key and a second key; and
   each of the first key and the second key are:
      defined by the provider account; and
      a modified key camouflaged with the PIN.

4. The method of claim 1, further comprising:
   providing the user OTP to an authenticating server;
   evaluating the user OTP using the authenticating server; and
   providing an authorization result to one of a provider system and the user.

5. The method of claim 4, wherein evaluating the user OTP further comprises:
   generating the user OTP using the authenticating server to create a regenerated OTP; and
   comparing the regenerated OTP and the user OTP.

6. The method of claim 1,
   wherein the user device is a first user device, the method further comprising:

providing the passcode application and the cardstring to a second user device such that both of the first and second user devices are configured to generate the user OTP using the passcode application; and providing the PIN to either of the first and second user devices to generate the user OTP.

7. The method of claim 4,
wherein the provider system is one of a payment system, a transaction system, an authentication system, a secure access system, and a secure data repository; and
wherein the authorization result is one of a payment authorization, a transaction authorization, an authentication authorization, a system access authorization, and a data access authorization.

8. The method of claim 1, further comprising:
providing a data element to the passcode application; and
generating the user OTP on the user device using the data element.

9. The method of claim 1,
wherein the user device is configured for communication with a network;
the method further comprising:
accessing the network using the user device; and
receiving the cardstring on the user device;
wherein the cardstring is provided to the user device via the network.

10. The method of claim 1, wherein the key is one of a symmetric key, a Data Encryption Standard (DES) key, an Advanced Encryption Standard (AES) key, a secret, a secret byte array, a seed, and a controlled datum.

11. The method of claim 1, wherein the cardstring is configurable as an Eurocard, MasterCard and Visa (EMV) cardstring; and the key is configurable as one of a Unique DEA Key A (UDKA) and a Unique DEA Key B (UDKB) key.

12. The method of claim 1, wherein cardstring is configurable as an OTP cardstring; and the key is configurable as a secret configurable to generate one of a standardized counter-based OTP (HOTP), a time-based OTP (TOTP), and a counter-based OTP.

13. The method of claim 1, further comprising:
providing another cardstring to the passcode application, wherein the passcode application is configured to generate another passcode configured as a user OTP for another provider account using the another cardstring;
wherein the another cardstring is defined by at least another key, wherein the at least another key is camouflaged with another PIN;
providing the another PIN to the passcode application; and
generating the user OTP for the another provider account on the user device using the another cardstring in combination with the another PIN.

14. The method of claim 13, further comprising:
providing a plurality of passcode generating algorithms to the passcode application;
providing a plurality of cardstrings to the user device, wherein:
each respective one of the plurality of cardstrings is defined by a respective one of a plurality of provider accounts, and
each respective one of the plurality of cardstrings is defined by at least one respective key that is camouflaged with a respective personal identification number (PIN);
wherein the passcode application is configured to generate a respective passcode configured as a respective user one time passcode (OTP) for each respective one of the plurality of provider accounts, using at least one of the plurality of passcode generating algorithms and the respective one of the plurality of cardstrings in combination with the respective one of the PINs;
selecting one of the plurality of provider accounts;
providing the respective PIN for the selected one of the plurality of provider accounts to the passcode application; and
generating the respective user OTP for the selected one of the plurality of provider accounts on the user device using the respective one of the plurality of cardstrings, the respective one of the PINS, and the at least one of the plurality of passcode generating algorithms.

15. A system for providing a one-time passcode (OTP) for a provider account, the system comprising:
a user device configured to receive a passcode application, a cardstring, and a personal identification number (PIN);
a provisioning server configured to provide the cardstring to the user device;
wherein the cardstring is defined by at least one key that is camouflaged with the PIN;
wherein the passcode application is configured to generate a passcode configured as a user OTP for the provider account; and
wherein the passcode application uses the cardstring and the PIN to generate the user OTP for the provider account.

16. The system of claim 15,
wherein the passcode application is configured to execute at least one passcode generating algorithm;
wherein the at least one passcode generating algorithm is configured to generate one of an Europay, MasterCard, and Visa (EMV) OTP, a standardized counter-based OTP (HOTP), a time-based OTP (TOTP), and a counter-based OTP; and
wherein the passcode application executes the at least one passcode generating algorithm to generate the user OTP for the provider account.

17. The system of claim 15, further,
wherein the passcode application is configured to receive a data element; and
wherein the passcode application uses the data element to generate the user OTP for the provider account.

18. The system of claim 15, further comprising:
an authenticating server configured to receive the user OTP; and
wherein the authenticating server is configured to provide an authorization result to one of a provider system and the user.

19. The system of claim 15, further comprising:
a user OTP counter configured to be received by the user device;
wherein the passcode application is configured to increment the user OTP counter;
wherein a provider system is configured to increment a provider OTP counter; and
one or the user device and the passcode application is configured to reset the user OTP counter to synchronize the user OTP counter and the provider OTP counter.

20. The system of claim 15, wherein the at least one camouflaged key is configured as a modified key encrypted with the PIN; and
wherein the key which is modified is defined by the provider account and is configured as one of a symmetric key, a Data Encryption Standard (DES) key, an Advanced Encryption Standard (AES) key, a secret, a secret byte array, a seed, and a controlled datum.

* * * * *